United States Patent [19]
Paik et al.

[11] Patent Number: 5,363,408
[45] Date of Patent: Nov. 8, 1994

[54] MODE SELECTIVE QUADRATURE AMPLITUDE MODULATION COMMUNICATION SYSTEM

[75] Inventors: Woo H. Paik, Encinitas; Scott A. Lery, Leucadia; John M. Fox, San Diego, all of Calif.

[73] Assignee: General Instrument Corporation, Hatboro, Pa.

[21] Appl. No.: 852,330

[22] Filed: Mar. 24, 1992

[51] Int. Cl.⁵ .................... H04L 5/12; H04L 23/02
[52] U.S. Cl. .................... 375/39; 375/106; 375/94; 329/304; 332/103; 371/46
[58] Field of Search .............. 375/39, 58, 60, 94, 375/8, 121, 106; 370/20; 455/60, 226.1; 329/304; 332/103; 371/37.4, 40.1, 43, 46

[56] References Cited

U.S. PATENT DOCUMENTS

| | | | |
|---|---|---|---|
| 4,495,619 | 1/1985 | Acampora | 375/58 |
| 4,501,020 | 2/1985 | Wakeman | 455/226.1 |
| 4,597,107 | 6/1986 | Ready et al. | 455/226.1 |
| 4,677,625 | 6/1987 | Betts et al. | 375/39 |
| 4,845,707 | 7/1989 | Isaacson et al. | 370/69.1 |
| 4,937,844 | 6/1990 | Kao | 375/39 |
| 5,117,427 | 5/1992 | Miyake et al. | 371/37.4 |

FOREIGN PATENT DOCUMENTS

| | | |
|---|---|---|
| 463269 | 1/1992 | European Pat. Off. |
| 3834377 | 4/1990 | Germany |

OTHER PUBLICATIONS

Viterbi, et al., "A Pragmatic Approach to Trellis—Coded Modulation," *IEEE Communications Magazine*, Jul.1989, pp. 11–19.

*Primary Examiner*—Stephen Chin
*Assistant Examiner*—Don Vo
*Attorney, Agent, or Firm*—Barry R. Lipsitz

[57] ABSTRACT

A quadrature amplitude modulation (QAM) communication system is provided in which data can be communicated in any one of a plurality of QAM modes, such as 16-QAM, 32-QAM, and 64-QAM. A receiver detects the particular QAM mode transmitted on a trial and error basis, by attempting to decode the received data using different QAM modes until a synchronization condition is detected. The synchronization condition can require that a plurality of different synchronization tests be met. In a specific embodiment, a first synchronization test is met when a renormalization rate of a trellis decoder is below a threshold value. A second synchronization test is met when a first synchronization word is detected in the received data. A third and final synchronization test is met when a second synchronization word is detected in the received data. In order to reduce the cost of the receiver, most of the QAM mode dependent components are implemented using look-up tables stored in PROMs.

19 Claims, 9 Drawing Sheets

CONSTELLATION LABELING

FIG. 4

| SUBSET LABELING | | HAMMING WEIGHT | EUCLIDIAN WEIGHT/4 |
|---|---|---|---|
| SUBSET | BINARY LABEL m1 m0 | | |
| 60 — ○ | 00 | 0 | 0 |
| 62 — ● | 10 | 1 | 1 |
| 64 — □ | 01 | 1 | 1 |
| 66 — ■ | 11 | 2 | 2 |

MODE SELECTIVE QUADRATURE AMPLITUDE MODULATION COMMUNICATION SYSTEM

BACKGROUND OF THE INVENTION

The present invention relates to trellis coded quadrature amplitude modulation (QAM) and more particularly to a flexible M-ary QAM communication system.

Digital data, for example digitized video for use in broadcasting high definition television (HDTV) signals, can be transmitted over terrestrial VHF or UHF analog channels for communication to end users. Analog channels deliver corrupted and transformed versions of their input waveforms. Corruption of the waveform, usually statistical, may be additive and/or multiplicative, because of possible background thermal noise, impulse noise, and fades. Transformations performed by the channel are frequency translation, nonlinear or harmonic distortion and time dispersion.

In order to communicate digital data via an analog channel, the data is modulated using, for example, a form of pulse amplitude modulation (PAM). Typically, quadrature amplitude modulation (QAM) is used to increase the amount of data that can be transmitted within an available channel bandwidth. QAM is a form of PAM in which a plurality of bits of information are transmitted together in a pattern referred to as a "constellation" that can contain, for example, sixteen, thirty-two, or sixty-four points.

In pulse amplitude modulation, each signal is a pulse whose amplitude level is determined by a transmitted symbol. In 16-QAM, symbol amplitudes of $-3$, $-1$, 1 and 3 in each quadrature channel are typically used. In 32-QAM, symbol amplitudes of $-5$, $-3$, $-1$, 1, 3 and 5 are typically used. In 64-QAM, the symbol amplitudes are typically $-7$, $-5$, $-3$, $-1$, 1, 3, 5 and 7.

Bandwidth efficiency in digital communication systems is defined as the number of transmitted bits per second per unit of bandwidth, i.e., the ratio of the data rate to the bandwidth. Modulation systems with high bandwidth efficiency are employed in applications that have high data rates and small bandwidth occupancy requirements. QAM provides bandwidth efficient modulation.

In bandwidth efficient digital communication systems, the effect of each symbol transmitted over a time-dispersive channel extends beyond the time interval used to represent that symbol. The distortion caused by the resulting overlap of received symbols is called intersymbol interference (ISI). This distortion has been one of the major obstacles to reliable high speed data transmission over low background noise channels of limited bandwidth. A device known as an "equalizer" is used to deal with the ISI problem. Furthermore, the channel characteristics are typically not known beforehand. Thus, it is common to use an "adaptive equalizer." A least mean square (LMS) error adaptive filtering scheme has been in common use as an adaptive equalization algorithm and is well known in the art. This algorithm is described, for example, in B. Windrow and M. E. Hoff, Jr., "Adaptive Switching Circuits," *IRE Wescon Conv. Rec.*, Part 4, pp. 96-104, Aug. 1960 and U. H. Qureshi, "Adaptive Equalization," *Proc. IEEE*, Vol. 73, No. 9, pp. 1349-1387, Sept. 1987.

For applications that are power limited and require high data reliability, as well as band limited and require high bandwidth efficiency, some form of error correction coding is required along with QAM. This can be accomplished, in part, through the use of trellis coded modulation (TCM). Trellis coded modulation is a combined coding and modulation technique for digital transmission over band limited channels. It allows the achievement of significant coding gains over conventional uncoded multilevel modulation, such as QAM, without compromising bandwidth efficiency. TCM schemes utilize redundant nonbinary modulation in combination with a finite-state encoder which governs the selection of modulation signals to generate coded signal sequences. In the receiver, the noisy signals are decoded by a soft-decision maximum likelihood sequence decoder. Such schemes can improve the robustness of digital transmission against additive noise by 3 dB or more, compared to conventional uncoded modulation. These gains are obtained without bandwidth expansion or reduction of the effective information rate as required by other known error correction schemes. The term "trellis" is used because these schemes can be described by a state-transition (trellis) diagram similar to the trellis diagrams of binary convolutional codes. The difference is that TCM extends the principles of convolutional coding to nonbinary modulation with signal sets of arbitrary size.

One application that is limited in power and bandwidth, which requires both high data reliability and bandwidth efficiency, is the digital communication of compressed high definition television signals. Systems for transmitting compressed HDTV signals have data rate requirements on the order of 15-20 megabits per second (Mbps), bandwidth occupancy requirements on the order of 6 MHz (the bandwidth of a conventional National Television System Committee (NTSC) television channel), and very high data reliability requirements (i.e., a very small bit error rate).

The data rate requirement arises from the need to provide a high quality compressed television picture. The bandwidth and power constraints are a consequence of the U.S. Federal Communications Commission requirement that HDTV signals occupy existing 6 MHz television channels, and must coexist with the current broadcast NTSC signals. This combination of data rate and bandwidth occupancy requires a modulation system that has high bandwidth efficiency. Indeed, the ratio of data rate to bandwidth must be on the order of 3 or 4. The requirement for a very high data reliability in the HDTV application results from the fact that highly compressed source material (i.e., the compressed video) is intolerant of channel errors. The natural redundancy of the signal has been removed in order to obtain a concise description of the intrinsic value of the data. For example, for a system to transmit at 15 Mbps for a twenty-four hour period, with less than one bit error, requires the bit error rate (BER) of the system to be less than one error in $10^{12}$ transmitted bits.

Data reliability requirements are often met in practice via the use of a concatenated coding approach, which is a divide and concur approach to problem solving. In such a coding framework, two codes are employed. An "inner" modulation code cleans up the channel and delivers a modest symbol error rate to an "outer" decoder. The inner code can be, for example, a TCM code. A known approach is to use a trellis code as the inner code with some form of the "Viterbi algorithm" as a trellis decoder. The outer code is most often a t-error-correcting, "Reed-Solomon" (RS) code. Such Reed-Solomon coding systems, that operate in the data rate range required for communicating HDTV data, are widely available and have been implemented in the integrated circuits of several vendors. The outer decoder removes the vast majority of symbol errors that have eluded the inner decoder in such a way that the final output error rate is extremely small.

A more detailed explanation of concatenated coding schemes can be found in G. C. Clark, Jr. and J. B. Cain, "Error-Correction Coding for Digital Communications", Plenum Press, New York, 1981; and S. Lin and D. J. Costello, Jr., "Error Control Coding: Fundamentals and Applications", Prentice-Hall, Englewood Cliffs, N.J., 1983. Trellis coding is discussed extensively in G. Ungerboeck, "Channel Coding with Multilevel/Phase Signals", *IEEE Transactions on Information Theory*, Vol. IT-28, No. 1, pp. 55-67, January 1982; G. Ungerboeck, "Trellis-Coded Modulation with Redundant Signal Sets—Part I: Introduction, —Part II: State of the Art", *IEEE Communications Magazine*, Vol. 25, No. 2, pp. 5-21, February 1987; and A. R. Caulderbank and N. J. A. Sloane, "New Trellis Codes Based on Lattices and Cosets", *IEEE Transactions on Information Theory*, Vol. IT-33, No. 2, pp. 177-195, March 1987. The Viterbi algorithm is explained in G. D. Forney, Jr., "The Viterbi Algorithm", *Proceedings of the IEEE*, Vol. 61, No. 3, March 1973. Reed-Solomon coding systems are discussed in the Clark, Jr. et al and Lin et al articles cited above.

There is usually a tradeoff between data reliability and bandwidth efficiency. For example, in an HDTV broadcast system, a tradeoff exists between area of coverage/station spacing and picture quality. Lower order QAM (e.g., 16-QAM) offers better area of coverage and allows closer station spacing than higher order QAM (e.g., 64-QAM), because of its lower received carrier-to-noise ratio (CNR) performance characteristic. On the other hand, higher order QAM offers better picture quality than lower order QAM, because of its higher bandwidth efficiency. Which order of QAM to choose is very often affected by such things as geographical location, available/permissible transmitter power, and channel conditions. These parameters can very often be determined at the transmitter. Therefore, it would be advantageous to provide a QAM communication system with the capability of automatically and reliably detecting the order of QAM (e.g., 16, 32 or 64-QAM) used by the transmitter (i.e., the transmitter "operating mode"). Such a system should provide a high data rate, with minimal bandwidth occupancy, and very high data reliability. The complexity of a receiver for use with such a system should be minimized, to provide low cost in volume production.

The present invention provides a communication system having the aforementioned advantages.

SUMMARY OF THE INVENTION

In accordance with the present invention, a QAM communication system is provided. The system includes a transmission subsystem having means for selectively encoding source data for transmission using one of a plurality of QAM modes. Such QAM modes can comprise, for example, 16-QAM, 32-QAM, and 64-QAM. It will be appreciated that other QAM modes are also contemplated. A receiver subsystem receives QAM data from the transmission subsystem, and detects the QAM mode of the received data. Means responsive to the detecting means decode the received data in accordance with the detected QAM mode.

In an illustrated embodiment, the QAM mode detecting means comprise means for monitoring at least one output of the decoding means to detect a synchronization condition achieved when the received data is processed using a proper QAM mode for the data. Means responsive to the monitoring means actuate the decoding means to attempt to decode the received data using different QAM modes until the synchronization condition is detected. The detection of the synchronization condition indicates that the QAM mode then in use by the decoder is the proper QAM mode for the received data. The illustrated embodiment requires a plurality of different synchronization tests to be met in order to achieve the synchronization condition.

In a more specific embodiment, the decoding means comprise a trellis decoder. A first synchronization test is met when a renormalization rate of the trellis decoder is below a threshold value. A second synchronization test is met when a first synchronization word is detected in the received data. A third synchronization test is met when a second synchronization word is detected in the received data. The synchronization condition occurs when each of the first, second and third synchronization tests are met.

A receiver is provided in accordance with the present invention for receiving QAM data transmitted in one of a plurality of QAM modes. The receiver comprises means for detecting the QAM mode of received data and means responsive to the detecting means for decoding the received data in accordance with the detected QAM mode. In an illustrated embodiment, the QAM mode detecting means comprise means for monitoring at least one output of the decoding means to detect a synchronization condition achieved when the received data is processed using a proper QAM mode for the data. Means responsive to the monitoring means actuate the decoding means to attempt to decode the received data using different QAM modes until the synchronization condition is detected. The detection of the synchronization condition indicates that the QAM mode then in use by the decoder is the proper QAM mode for the received data.

In a specific receiver embodiment, the synchronization condition requires a plurality of different synchronization tests to be met. For example, the decoding means can comprise a trellis decoder, with a first synchronization test being met when a renormalization rate of the trellis decoder is below a threshold value. A second synchronization test is met when a first synchronization word is detected in the received data. A third synchronization test is met when a second synchronization word is detected in the received data. The synchronization condition occurs when each of the first, second and third synchronization tests are met.

In a more specific embodiment, the receiver comprises an inner decoder followed by an outer decoder for decoding received data. First deinterleaver means are provided for deinterleaving received data prior to input to the inner decoder. Second deinterleaver means are provided for deinterleaving data from the inner decoder prior to input to the outer decoder. Means are provided for determining when a renormalization rate of the inner decoder is below a threshold value, indicating that a first synchronization test has been met. First means are provided for detecting a first synchronization word in data output from the inner decoder, indicating that a second synchronization test has been met. Second means are provided for detecting a second synchronization word in data output from the outer decoder, indicating that a third synchronization test has been met. The synchronization condition is achieved when each of the first, second and third synchronization tests have been met.

The inner decoder can comprise a Viterbi decoder having a selectable renormalization rate threshold. Means are provided in the Viterbi decoder that are responsive to an attainment of the synchronization condition, for increasing the threshold to reduce the probability that the first synchronization test will subsequently fail. The outer decoder can comprise a Reed-Solomon decoder.

The receiver can further comprise at least one of an automatic gain control circuit, adaptive equalizer circuit, and carrier recovery circuit coupled to process received data prior to input to the inner decoder. The inner decoder and the adaptive equalizer, automatic gain control, and carrier recovery circuits, if provided, can comprise look-up tables for outputting data specific to a selected QAM mode.

The receiver can further comprise memory means for storing data indicative of the detected QAM mode. The provision of such a memory avoids any need to reacquire the mode once it has been determined, unless the transmitting mode subsequently changes.

As noted, in the illustrated embodiment the QAM mode detecting means comprise means for actuating the decoding means to attempt to decode the received data using different QAM modes until the synchronization condition is detected. In a specific implementation, the actuating means first actuates the decoding means to attempt to decode the received data using a low order QAM mode. If this is not successful, then the decoding means is subsequently actuated to attempt to decode the received data using progressively higher order QAM modes until the sync condition is finally detected.

DETAILED DESCRIPTION OF THE INVENTION

Figure 1:
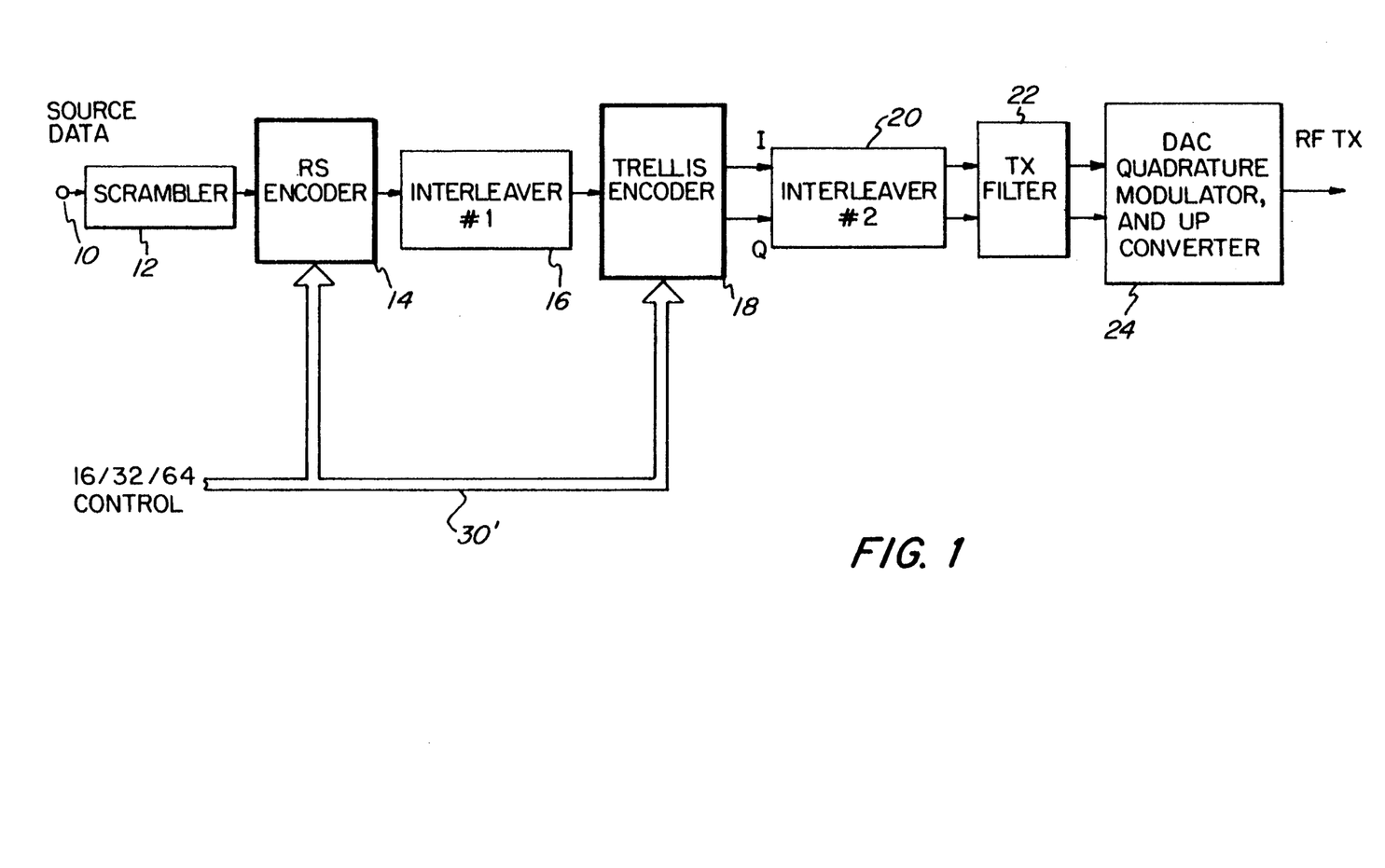
FIG. 1 is a block diagram of the transmitter side of a flexible QAM mode communications system in accordance with the present invention.

FIG. 1 illustrates a particular embodiment of a transmitter in accordance with the present invention which is capable of transmitting data using a selected one of a plurality of QAM modes. The illustrated embodiment can transmit either 16-QAM, 32-QAM, or 64-QAM. It should be appreciated, however, that different orders of QAM could be substituted without departing from the principles of the present invention. In the various block diagrams provided in the drawings, the components outlined in bold are QAM mode dependent. Each of these components receives a QAM mode signal from a control bus 30 (receiver) or 30' (transmitter) that identifies the current QAM mode. Those components that are not QAM mode dependent are illustrated in boxes that are not outlined in bold.

In the transmitter, a Reed-Solomon encoder 14, and trellis encoder 18 are QAM mode dependent. Source data input to terminal 10 is coupled to the Reed-Solomon encoder 14 via a conventional scrambler 12. The Reed-Solomon encoder uses the QAM mode information to properly configure its block size. Once configured, the Reed-Solomon encoder operates in a conventional manner to encode the scrambled data with information that is used by a corresponding Reed-Solomon decoder at the receiver to correct transmission errors.

The encoded, scrambled data from Reed-Solomon encoder 14 is passed to a conventional block interleaver 16 that is used in conjunction with a corresponding deinterleaver 96 in the receiver (FIG. 6) to improve the performance of the receiver Reed-Solomon decoder 98 by dispersing burst errors generated by the receiver, and specifically by the trellis decoder 90 used in the receiver. Another interleaver 20 at the output of trellis encoder 18 (FIG. 1) is provided to combat burst/impulse noises that occur over the communication channel between the transmitter and receiver. Interleaver 20 is a conventional random convolutional interleaver, e.g., with 32 possible starting addresses.

Figure 2:
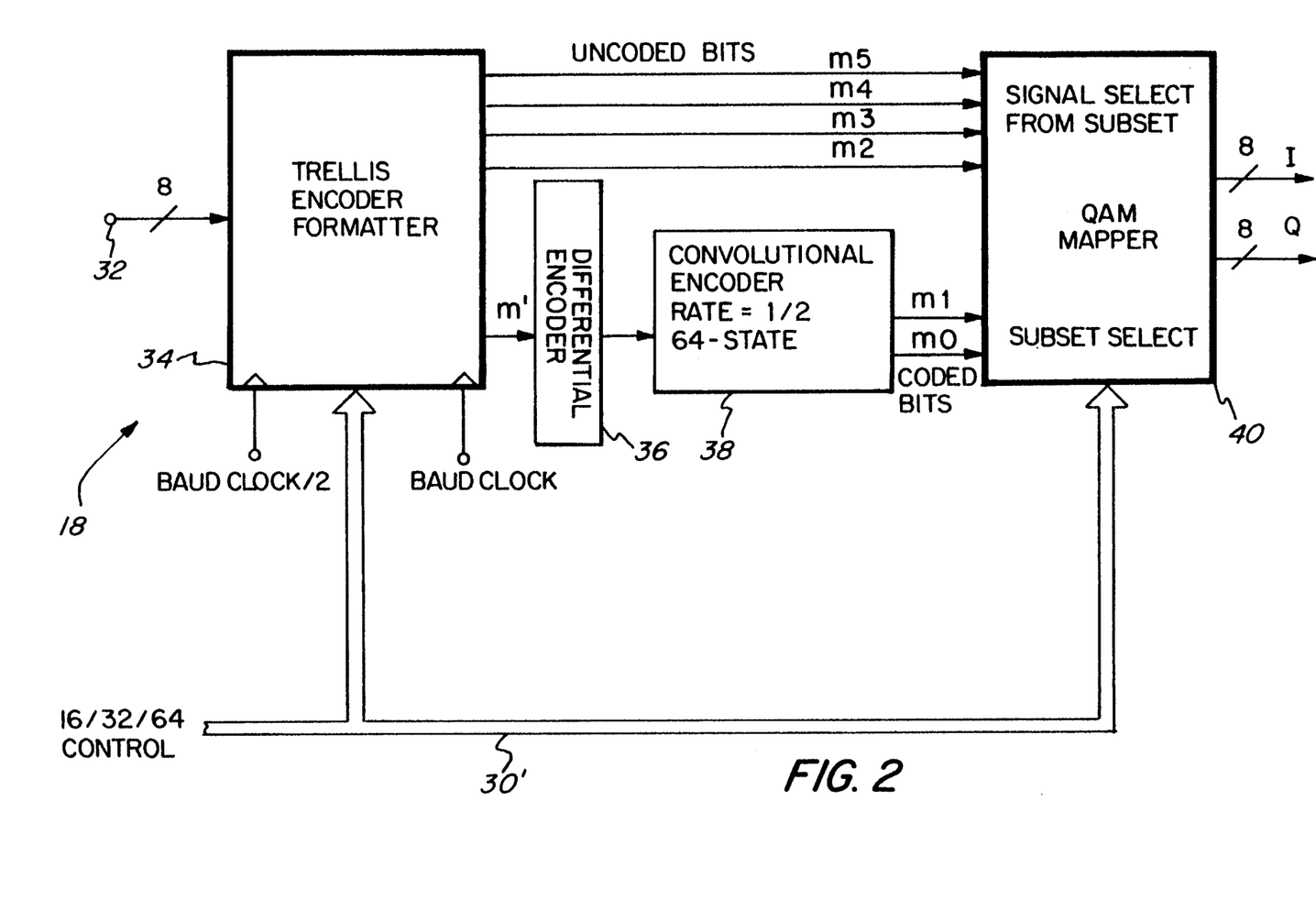
FIG. 2 is a more detailed block diagram of the trellis encoder illustrated in FIG. 1.

Trellis encoder 18, shown in more detail in FIG. 2, consists of two QAM mode dependent elements. These are a trellis encoder formatter 34 and a QAM mapper 40. In the illustrated embodiment, trellis encoder formatter 34 receives data in eight-bit bytes at half the baud rate from the interleaver 16 via terminal 32, and produces three, four or five-bit nibbles (depending on the mode) at the output thereof and at the baud rate. For 16-QAM, trellis encoder formatter 34 will output three-bit nibbles comprising m', m2, and m3. For 32-QAM, formatter 34 outputs four-bit nibbles comprising m', m2, m3, and m4. For 64-QAM, formatter 34 outputs five-bit nibbles comprising m', m2, m3, m4, and m5.

The least significant bit m' of the nibble is differentially encoded in a differential encoder 36, and then convolutionally encoded in encoder 38 using a rate $\frac{1}{2}$, 64 state code (with generators $G1=171_8$ and $G2=133_8$). The convolutional code is transparent to channel inversions, so that by using differential coding/decoding, the 0/180° phase ambiguity at the receiver is "automatically" resolved. The two coded bits m0 and m1 produced by the convolutional encoder 38 along with the most significant bits m2, m3, m4, and m5 of the nibble output from formatter 34 are presented to the QAM mapper 40 along with an indication via control bus 30' as to the specific QAM mode (16/32/64) being used. QAM mapper 40 can comprise a programmable read only memory (PROM) having a separate look-up table for each of the possible QAM modes, which look-up tables are addressed by the coded bits m0, m1 and uncoded bits m2 to m5 from the convolutional encoder 38 and trellis encoder formatter 34, respectively. The appropriate look-up table selected by the QAM mode information from bus 30' outputs the actual I and Q data to be interleaved by interleaver 20, filtered by a transmission filter 22, and communicated as a radio frequency (RF) signal over a communication channel after processing by conventional digital to analog converter (DAC), quadrature modulator, and upconverter circuits 24 illustrated in FIG. 1.

Figure 3:
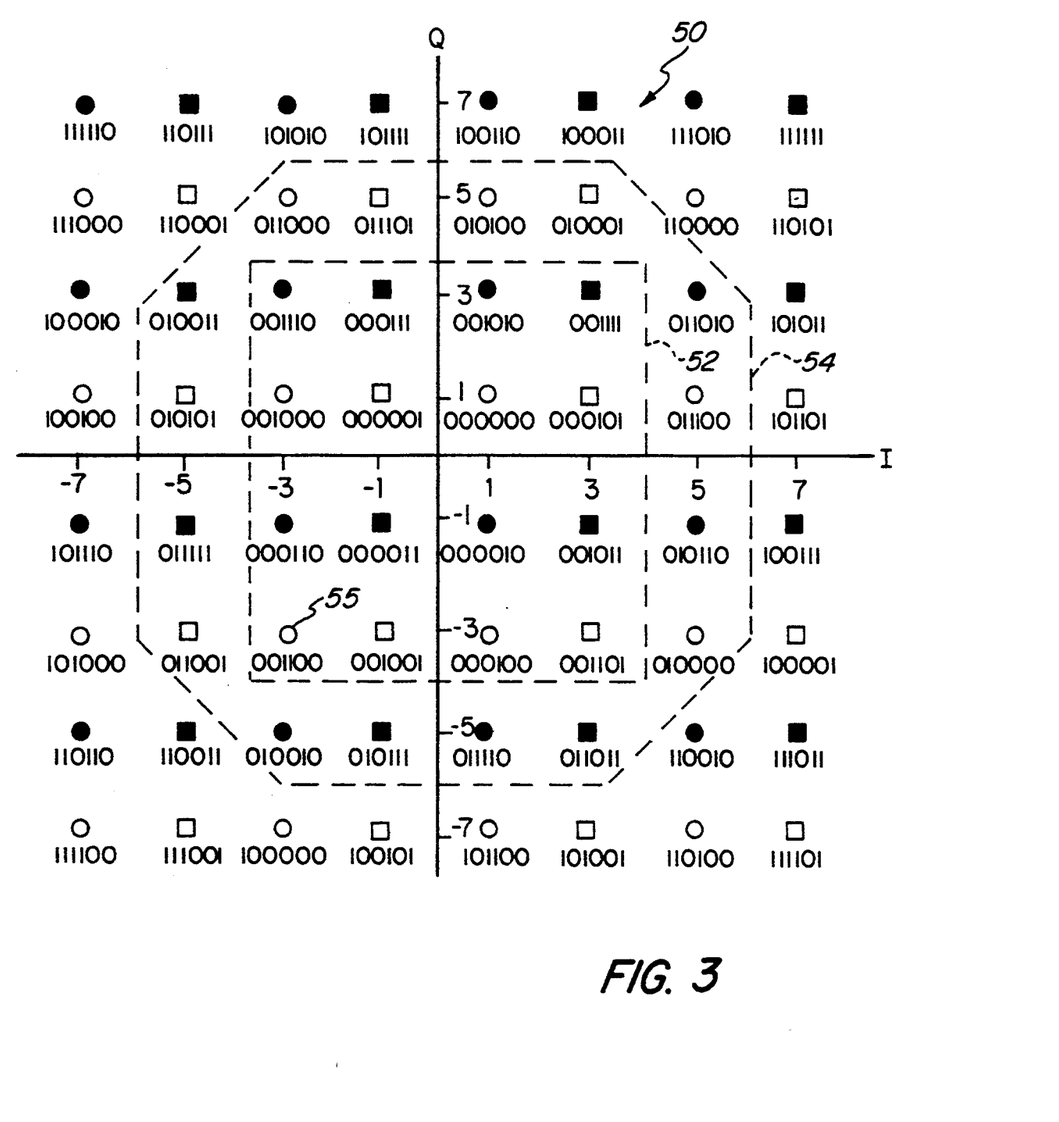
FIG. 3 is a mapping illustrating constellation patterns for 16-QAM, 32-QAM, and 64-QAM.
Figure 4:
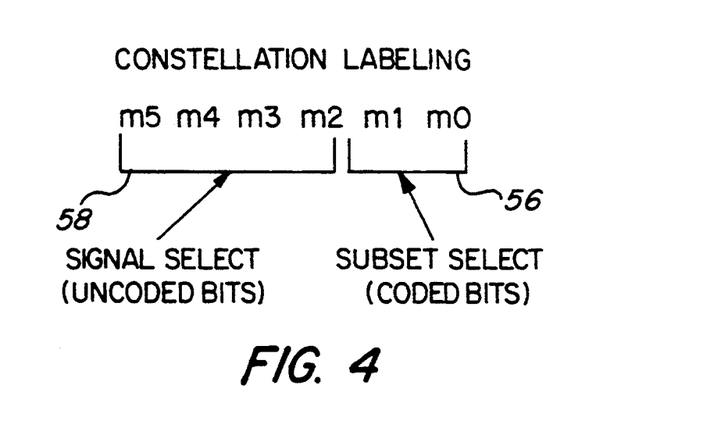
FIG. 4 is a diagram useful in explaining how the constellation points in the constellation patterns of FIG. 3 are labelled.
Figure 5:
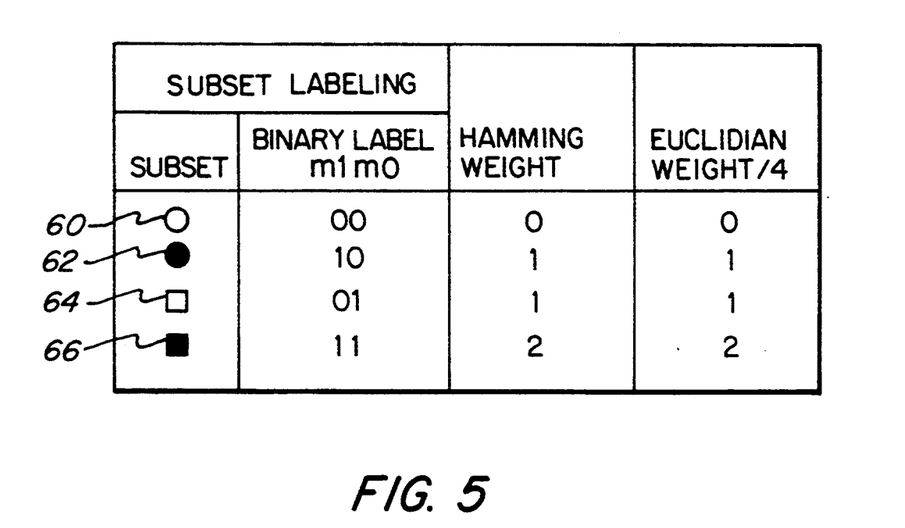
FIG. 5 is a diagram defining the subset labeling for the constellation patterns of FIG. 3.

The function of QAM mapper 40 is illustrated in FIGS. 3–5. FIG. 3 illustrates a 64-QAM constellation pattern generally designated 50, that includes a 16-QAM subset 52 and a 32-QAM subset 54. As illustrated in FIG. 4, each constellation point is labelled by a six-bit word, wherein the two least significant bits 56 (m0, m1) are output from convolutional encoder 38 and represent a particular one of four subsets 60, 62, 64, 66 shown in FIG. 5. The four most significant bits 58 (m2, m3, m4, m5) are the uncoded bits from the trellis encoder formatter 34, and specify which particular constellation point in the subset is being identified. Thus, for example, constellation point 55 in FIG. 3 is identified as belonging to subset 60 since bite m0 and m1 are both zeros. The particular location of point 55 within subset 60 is identified by bits m2 and m3 both being ones.

Constellation pattern 50 is arranged such that the intersubset Hamming distance is proportional to the intersubset Euclidian distance. This facilitates the reception of individual symbols at the receiver. The mapping provided makes the uncoded bits m2 through m5 90' rotationally invariant. The coded bite m0, m1 are not invariant to ±90° rotations, but, as previously mentioned, are invariant to a 180° rotation due to differential coding and a transparent convolutional code.

Figure 6:
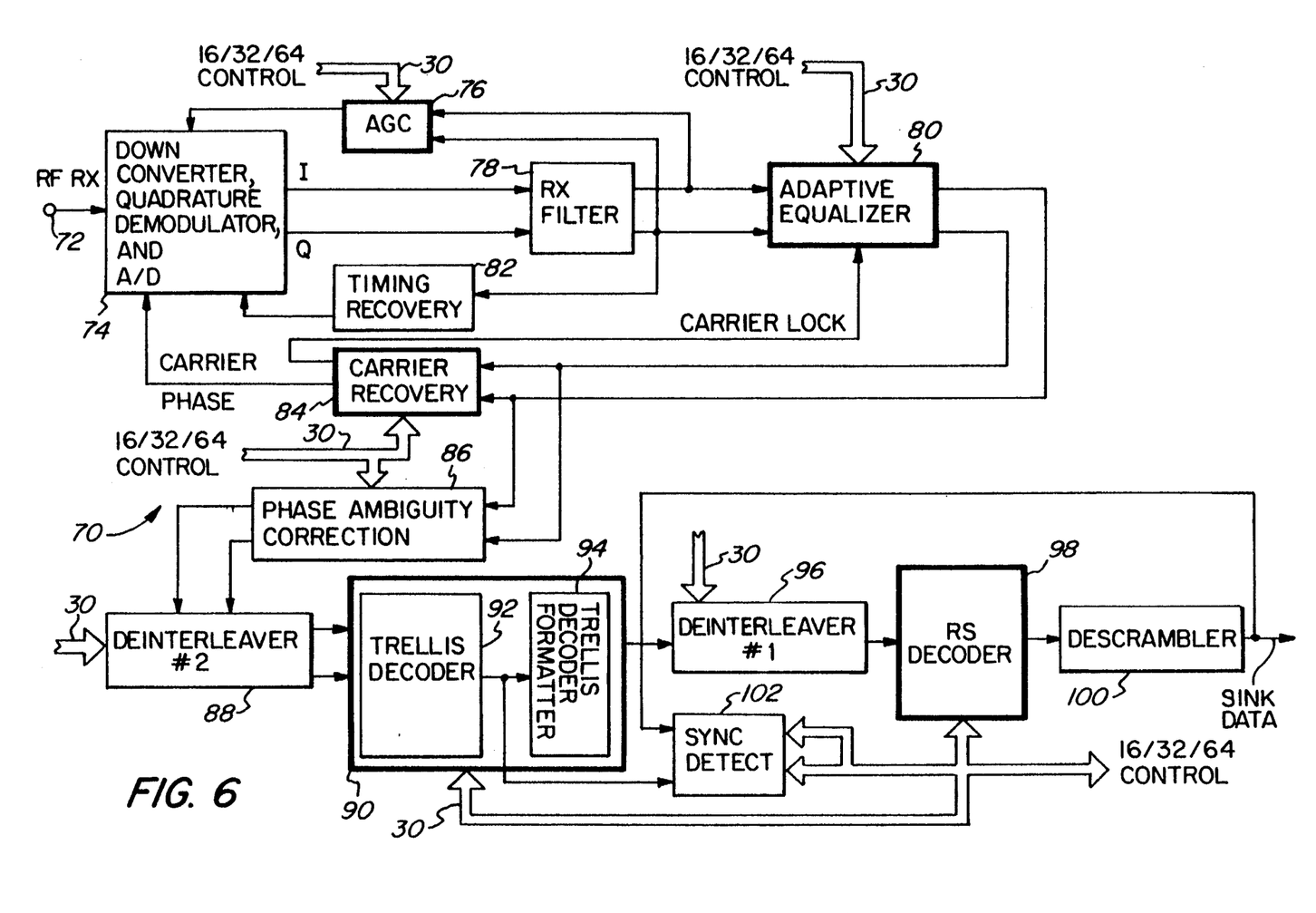
FIG. 6 is a block diagram of the receiver side of the flexible QAM mode communications system of the present invention.

A receiver for the transmitted data (QAM "symbols") is illustrated in FIG. 6. As with the transmitter, the specific receiver embodiment illustrated can handle 16-QAM, 32-QAM, or 64-QAM. It will be appreciated, however, that receivers for other QAM modes can be similarly constructed in accordance with the present invention.

In the illustrated receiver, QAM mode dependent circuits include an automatic gain control (AGC) 76, adaptive equalizer 80, carrier recovery circuit 84, trellis decoder 90, Reed-Solomon decoder 98, and synchronization detection circuit 102. Sync detector 102 is the circuit that is responsible for detecting the QAM operating mode of a received signal. In order to simplify the receiver and reduce its cost, the majority of mode dependent components can be implemented as PROMs, whose contents are based on the 16/32/64 constellations illustrated in FIG. 3.

A received radio frequency signal is input to a conventional down converter, quadrature demodulator, and analog-to-digital converter 74 via input terminal 72. The recovered I and Q components are filtered by a conventional receiver filter 78, and output to an adaptive equalizer 80 that receives the QAM mode control signal via control bus 30. The filtered I and Q components are also input to an automatic gain control circuit 76 that receives the QAM mode control signal from control bus 30. A timing recovery circuit 82 receives the Q component and uses a transition detector to drive a phase locked loop for feedback to the A/D converter section of down converter, quadrature demodulator and A/D circuitry 74.

Figure 7:
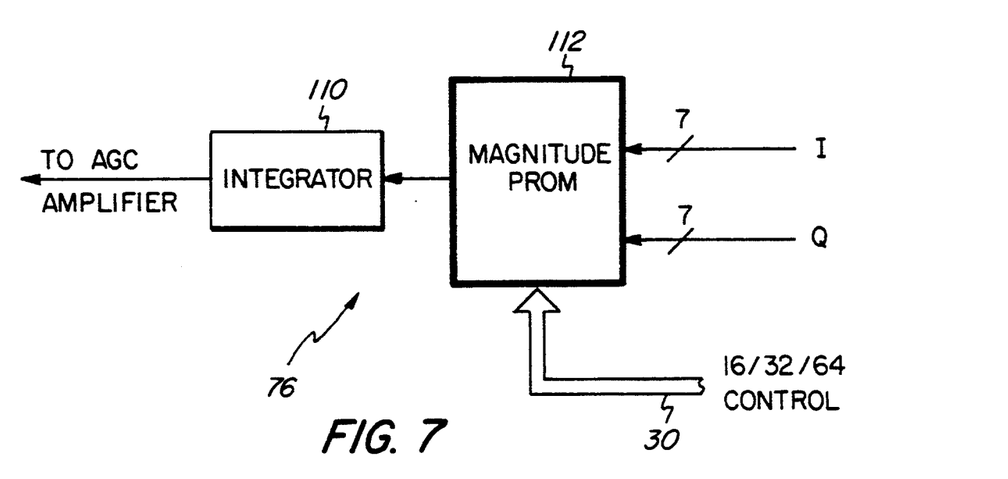
FIG. 7 is a more detailed block diagram of the automatic gain control (AGC) shown in FIG. 6.

Automatic gain control 76 can utilize a magnitude PROM that contains look-up tables for the various possible QAM modes, and outputs a one or zero, depending on whether the magnitude of the received signal is greater than or less than a QAM mode dependent threshold. The particular look-up table used is selected by the QAM mode control signal input from bus 30. The automatic gain control is illustrated in greater detail in FIG. 7. In particular, a magnitude PROM 112 as described above outputs a binary signal to an integrator 110, for subsequent amplification and output to the quadrature demodulator 74.

Figure 8:
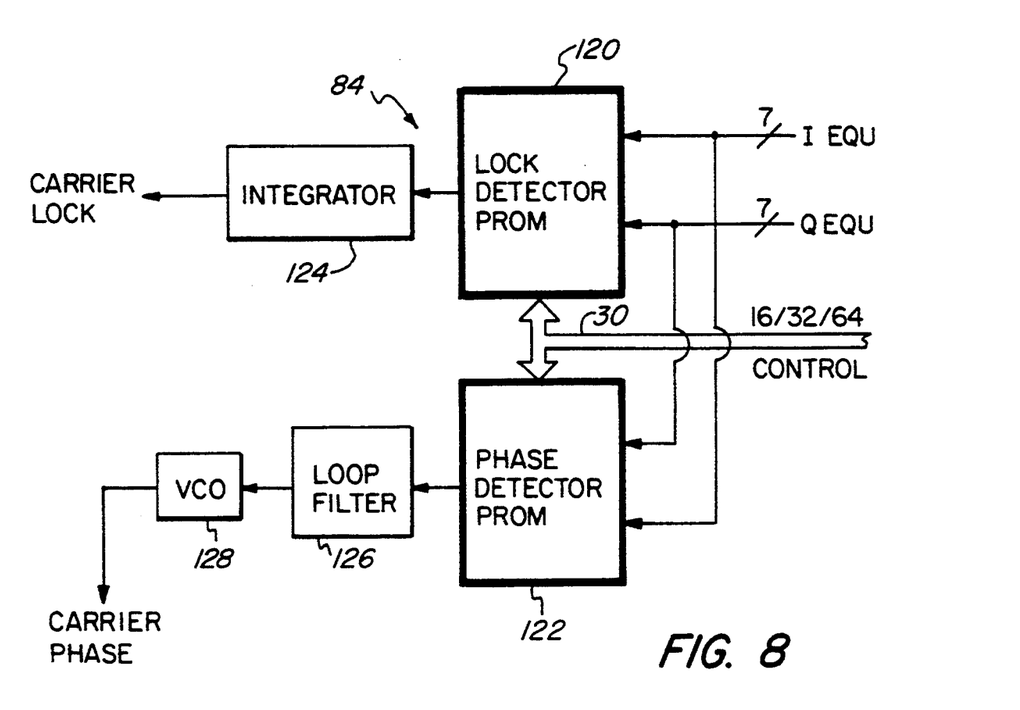
FIG. 8 is a more detailed block diagram of the carrier recovery circuit illustrated in FIG. 6.

A carrier recovery circuit 84 receives the equalized I and Q components from equalizer 80. The carrier recovery circuit is illustrated in greater detail in FIG. 8. As illustrated, two QAM mode dependent PROMs 120, 122 are provided. PROM 120 provides carrier lock detection and PROM 122 provides phase detection. Phase detector PROM 122 outputs a one or zero to a loop filter 126, depending on whether the phase of the received symbol (i.e., constellation point) is within or outside of particular "phase regions" defined in the I-Q plane of FIG. 3. The use of such a phase region scheme is disclosed, for example, in A. Leclert and P. Vandamme, "Universal Carrier Recovery Loop for QASK and PSK Signal Sets," *IEEE Trans. on Commun.*, Vol. COM-31, pp. 130–136, Jan. 1983. Lock detector PROM 120 outputs a zero or one to an integrator 124 depending on whether the phase of the received signal is within or outside particular "lock regions" defined around the constellation points in the I-Q plane. The particular look-up table to be used in each of PROMS 120, 122 is selected by the QAM mode control signal from control bus 30. The filtered output from PROM 122 is input to a voltage controlled oscillator 128 to produce a carrier phase signal that is input to quadrature demodulator 74. The carrier lock signal from integrator 124 is input to adaptive equalizer 80.

Figure 9:
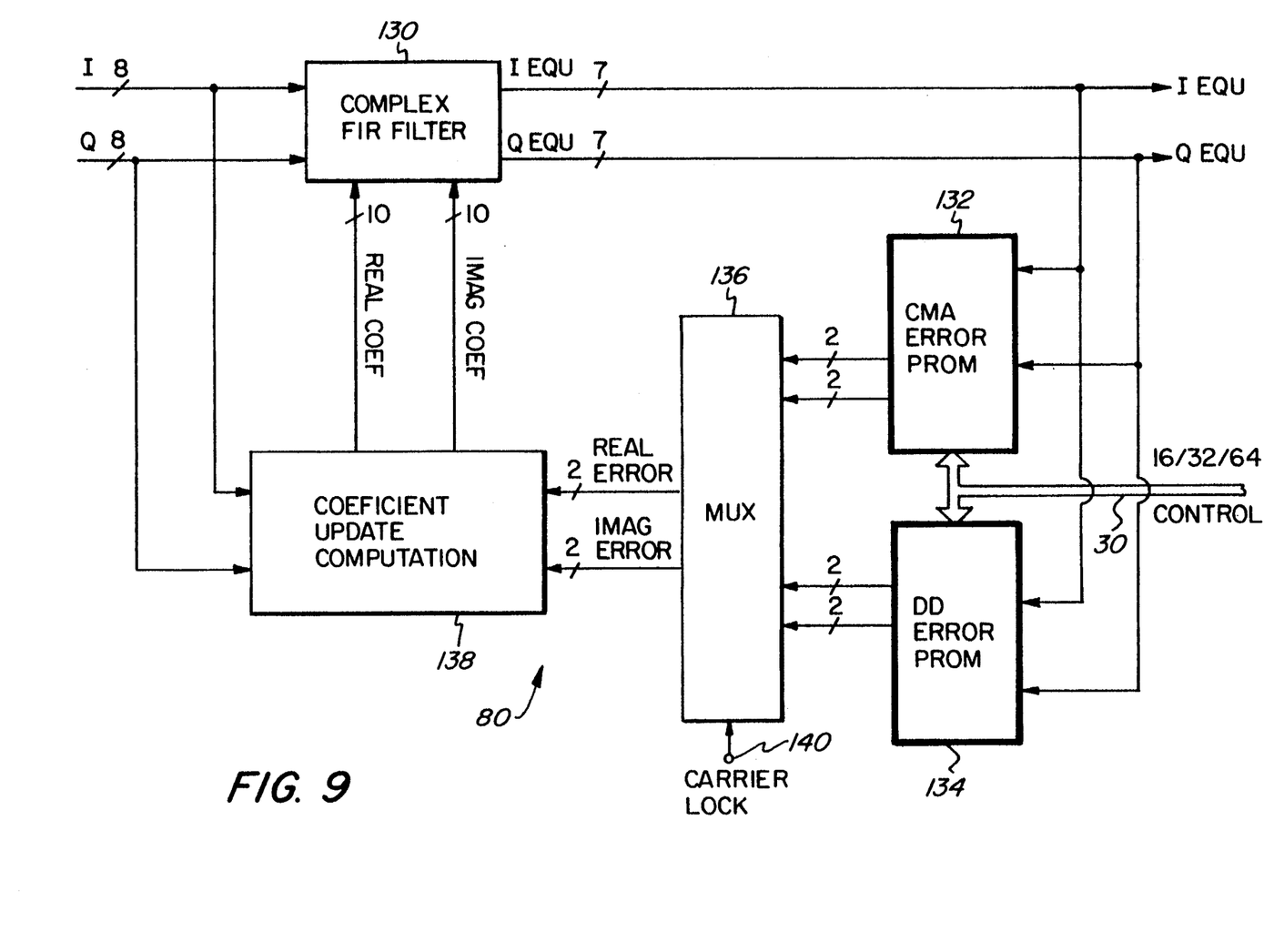
FIG. 9 is a more detailed block diagram of the adaptive equalizer illustrated in FIG. 6.

Adaptive equalizer 80 is shown in greater detail in FIG. 9. The I and Q signal components from the receiver filter 78 (FIG. 6) are input to a finite-duration impulse-response (FIR) filter 130 and to a coefficient update computation circuit 138. After filtering by filter 130, the "equalized" $I_{equ}$ and $Q_{equ}$ components are input to two mode dependent PROMs 132, 134 that generate error signals using a least mean squared (LMS) algorithm for updating the adaptive filter coefficients. The constant modulus algorithm (CMA) error PROM 132 is a two-bit quantized version of the complex error given by $$E(k)_{CMA} = \{|y(k)|^2 - R_2\} y(k)$$

where y(k) is the complex output of the adaptive equalizer and $R_2$ is a mode (constellation) dependent constant. The decision directed (DD) error PROM 134 is a two-bit quantized version of the complex error given by $$E(k)_{DD} = y'(k) - y(k)$$

where y'(k) is the "signal decision." The signal decision is based on a determination as to which constellation point a received signal point is closest to. Hence, the signal decision is mode dependent. The CMA error is used to train the equalizer (blind equalization), while the DD error is used to complete convergence of the equalizer. The two error signals are under the control of the carrier lock signal generated by the carrier recovery circuit, and input to a multiplexer 136 via terminal 140. An adaptive equalizer of similar design for single QAM mode operation is shown in greater detail in commonly assigned, copending U.S. patent application Ser. No. 07/733,790 filed on Jul. 26, 1991 for "Carrier Phase Recovery for an Adaptive Equalizer." See also, D. N. Godard, "Self-Recovering Equalization and Carrier Tracking in Two-Dimensional Data Communication Systems," *IEEE Trans. on Commun.*, Vol. COM-28, pp. 1867–1875, November 1980.

The equalized $I_{equ}$ and $Q_{equ}$ components output from adaptive equalizer 80 are input to trellis decoder 90 via a phase ambiguity correction circuit 86 and a deinterleaver 88. Phase ambiguity correction is necessary because, as noted above, the coded bits are not invariant to ±90° rotations. The phase ambiguity correction circuit 86 interchanges the $I_{equ}$ and $Q_{equ}$ signals and inverts the resultant $I_{equ}$ component as necessary, in response to a phase ambiguity control signal carried on bus 30, to resolve the 90° ambiguity.

Deinterleaver 88 is a conventional component that is complementary to interleaver 20 at the transmitter. The deinterleaved signal is input to trellis decoder 90, which includes a trellis decoder 92 and a trellis decoder formatter 94. These components are illustrated in greater detail in FIG. 10.

Figure 10:
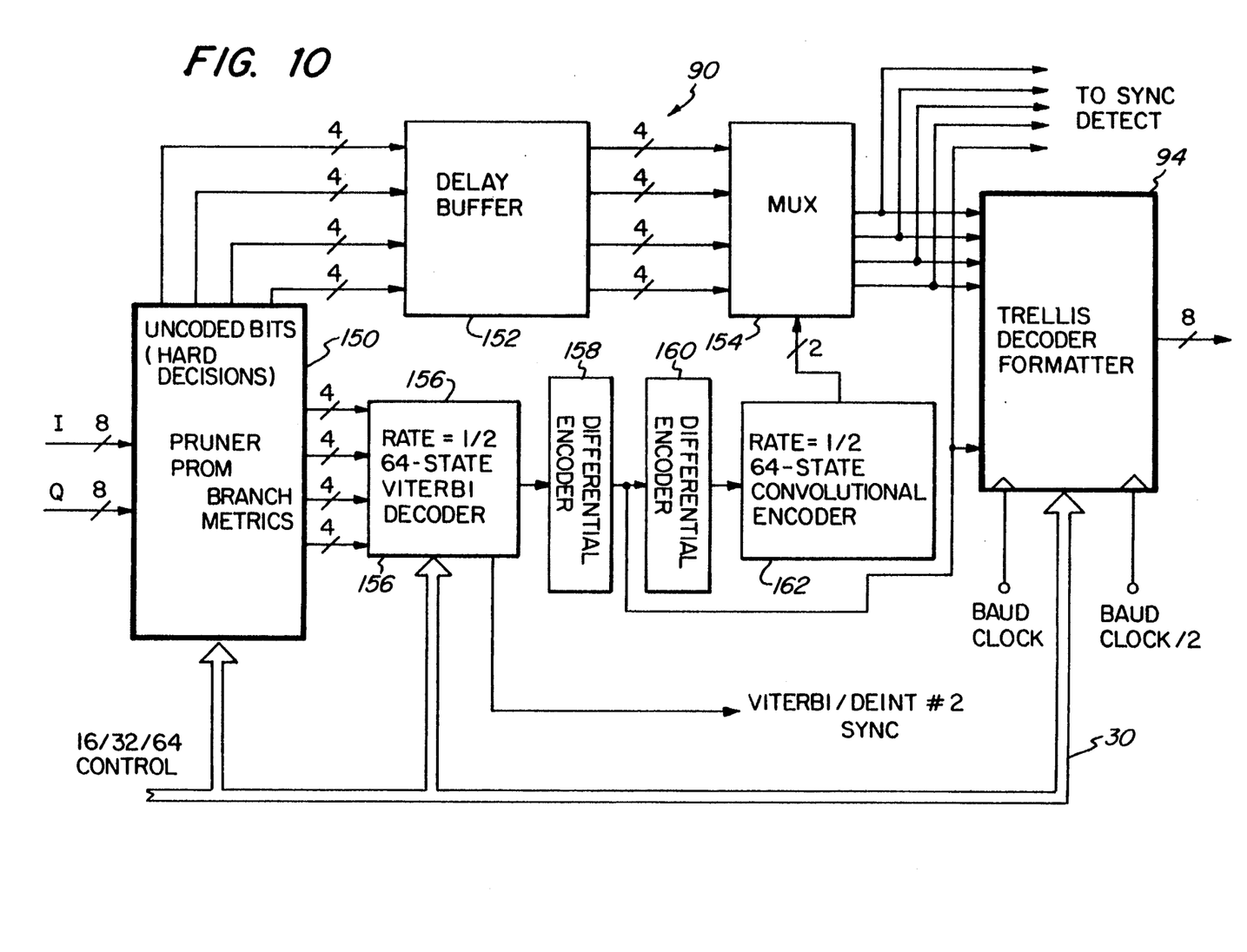
FIG. 10 is a more detailed block diagram of the trellis decoder illustrated in FIG. 6.

The trellis decoder shown in FIG. 10 includes a pruner PROM 150 that is QAM mode dependent. The QAM mode selection signal is received by PROM 150 via control bus 30. The trellis decoder formatter 94 is also QAM mode dependent, and receives the mode identification signal from bus 30. Pruner PROM 150 has two sets of outputs. One of the outputs is a set of four metrics corresponding to the four subsets of the constellation. These metrics are input to a rate ½ 64 state Viterbi decoder 156. Each metric is the distance (quantized to four bits) from the received signal point to the nearest constellation point in each subset.

Pruner PROM 150 also outputs the uncoded bits associated with the constellation point in each subset that is closest to the received point. The uncoded bits are delayed in a delay buffer 152 by an amount equal to the memory of the Viterbi decoder, because the Viterbi decoder bases its decisions on past information.

The decision output from the Viterbi decoder is differentially decoded in a differential decoder 158, to produce one of the decoded bits. This decoded bit is used to recover the two coded bits produced by the trellis encoder at the transmitter by encoding it in a differential encoder 160 and then convolutionally re-encoding it in a rate one-half, 64 state convolutional encoder 162. The two recovered coded bits output from encoder 162 are used to select the correct uncoded bits via a multiplexer 154. The selected bits are presented to both the sync detector circuitry 102 (FIG. 6) and the trellis decoder formatter 94. The sync detect circuitry and trellis decoder formatter also receive the decoded bit output from differential decoder 158. The trellis decoder formatter takes three, four, or five-bit nibbles (depending on the QAM mode) at the baud rate, and produces eight-bit bytes at half the baud rate, in accordance with baud clock and one-half baud clock signals input to the trellis decoder formatter.

Figure 11:
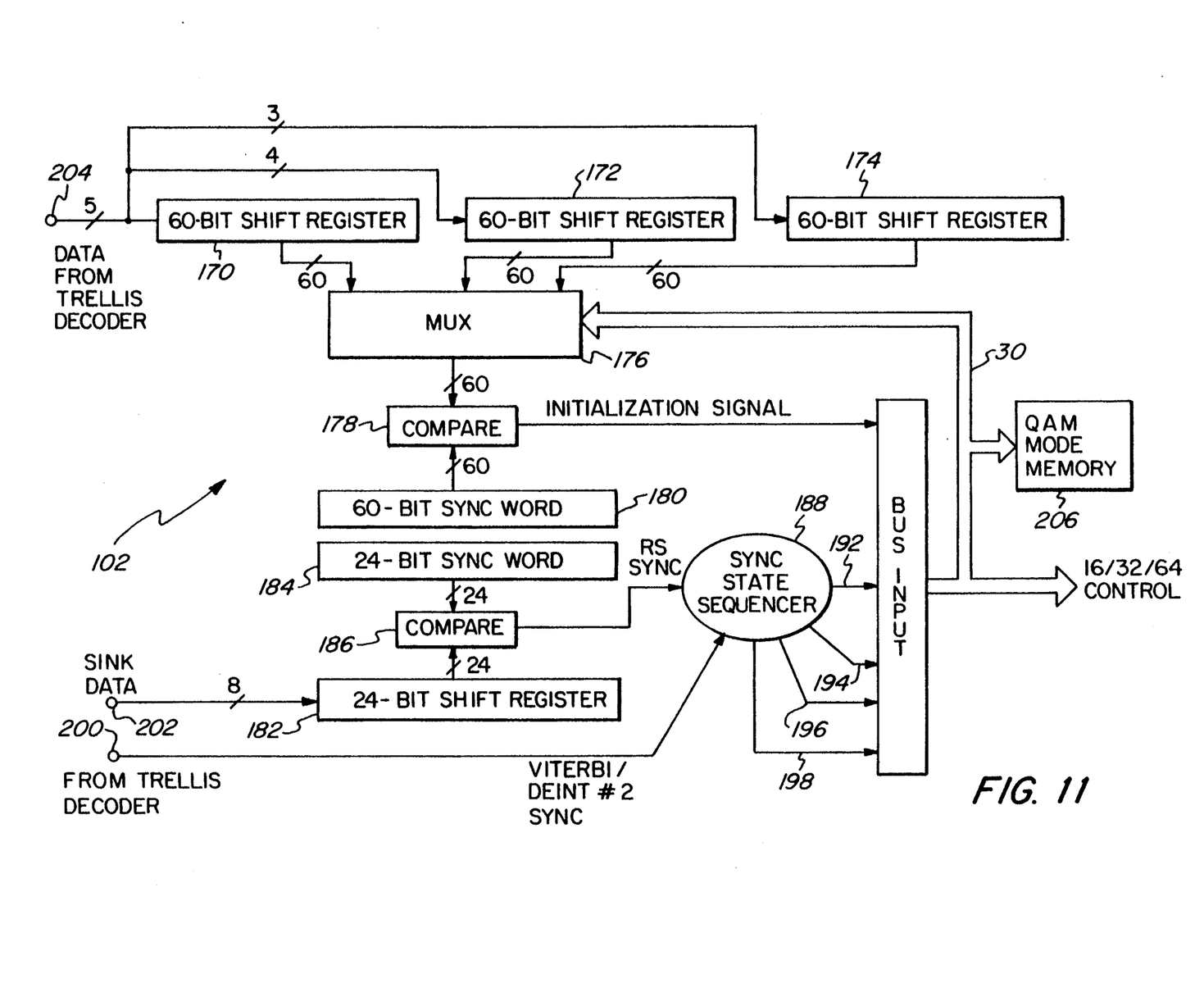
FIG. 11 is a more detailed block diagram of the synchronization detection (sync detect) circuitry shown in FIG. 6.

The sync detection circuitry 102 of FIG. 6 is illustrated in greater detail in FIG. 11. This circuitry is used to detect the QAM mode of the received signal. In accordance with the present invention, the actual QAM mode is determined by trying to achieve a synchronization condition using the different possible QAM modes. In a preferred embodiment, the lowest order mode (e.g., 16-QAM) is tried first. If a synchronization condition cannot be achieved using the lowest order QAM mode, the next higher order QAM mode is tried. The process continues until the synchronization condition is attained.

In a preferred embodiment of the present invention, the achievement of the synchronization condition requires three separate synchronization tests to be met. The first test is passed when a renormalization rate of the trellis decoder drops below a threshold value. The second test is passed when a first predetermined synchronization word is located in the received data. The third synchronization test is passed when a second predetermined synchronization word is found in the received data. The synchronization words can comprise, for example, well known m-sequences that would not normally be found within a random data sequence. Such sequences are described, for example, in V. K. Bhargava, et al, *Digital Communications by Satellite*, John Wiley & Sons, New York, ©1991, pp. 280–281.

Viterbi decoder 156 will monitor the renormalization rate of its internal path metrics. The renormalization rate is a very good indicator of synchronization of those elements preceding the Viterbi decoder. In the illustrated embodiment, the renormalization rate will be "high" when deinterleaver 88 (FIG. 6) is out of sync and/or when the input to the trellis decoder requires a 90° rotation via phase ambiguity correction circuit 86. A threshold is set within the Viterbi decoder. When the renormalization rate is above the threshold, an out-of-sync condition exists. When the renormalization rate is below the threshold, synchronization of the elements preceding the Viterbi decoder has been achieved. In order to obtain synchronization of these elements, the sync state sequencer 188 causes different addresses to be tried to deinterleaver 88, and also rotates the input to the trellis decoder by 90° via phase ambiguity correction circuit 86, until the Viterbi decoder declares synchronization.

Deinterleaver 88 is a convolutional deinterleaver having 32 possible starting addresses. An address control signal is output from the sync state sequencer 188 via line 192, and merged onto the control bus 30. The control bus communicates the address control signal to deinterleaver 88 in order to successively try different addresses. After an address is tried, a phase ambiguity control signal output from sync state sequencer 188 on line 194 is communicated via control bus 30 to phase ambiguity correction circuitry 86. At this point, the input signal is rotated by 90°, so that the Viterbi decoder can attempt to achieve a renormalization rate below the threshold for the current deinterleaver address using both rotated and unrotated input data. If the renormalization rate does not drop below the threshold within a predetermined time-out period, then the sync state sequencer will increment to the next deinterleaver address, and the process will repeat until the Viterbi decoder declares sync or the next QAM mode is tried. When sync is finally declared, the trellis decoder outputs a "Viterbi/deint #2 sync" signal which is input to the sync state sequencer 188 via terminal 200 (FIG. 11).

In order to proceed with the second synchronization test, the synchronization circuitry of FIG. 11 receives the four bits of uncoded data and one bit of coded data (five bits total) via an input terminal 204 from the trellis decoder of FIG. 10. The five bits appear on the lines labeled "to sync detect" in FIG. 10. All five bits of the data are input to a sixty-bit shift register 170. The four least significant bits of the data are also input to a sixty-bit shift register 172. The three least significant bits of the data are further input to a sixty-bit shift register 174. The outputs of each of the sixty-bit shift registers are coupled to a multiplexer (MUX) 176, that selects one of the outputs in response to the current QAM mode control signal carried on bus 30. Initially, the QAM mode control signal will indicate 16-QAM mode, causing the multiplexer to output data from the sixty-bit shift register 174, which pertains to the 16-QAM mode of operation. As noted above, if the synchronization condition cannot be achieved using the 16-QAM mode, the QAM mode control signal will be shifted up to the 32-QAM mode, at which point data from shift register 172 will be output from MUX 176. If the synchronization condition is still not achieved, the QAM mode control signal will actuate MUX 176 to output data from shift register 170, pertaining to the 64-QAM mode.

The data output from MUX 176 is compared in a standard compare circuit 178 with a predetermined sixty-bit sync word stored in memory 180. When compare circuit 178 finds a match between the sixty-bit sync word and data output from MUX 176, the second synchronization test will be met. At this point, compare circuit 178 will output a signal indicating that the sixty-bit sync word has been found. This signal is used to initialize the trellis decoder formatter, deinterleaver 96, and Reed-Solomon decoder 98.

Having passed the second synchronization test, the synchronization detection circuitry 102 will proceed to the third synchronization test. This involves inputting the "SINK" data from descrambler 100 (FIG. 6) into a 24-bit shift register 182 (FIG. 11) via terminal 202. A compare circuit 186 compares the data from shift register 182 to a 24-bit sync word stored in memory 184. The comparison will continue to be made until the 24-bit sync word is detected in the incoming data. If the 24-bit sync word is not detected after a predetermined time period, the system will switch to the next possible QAM mode in an attempt to achieve full synchronization. This is accomplished by sync state sequencer 188 outputting the next higher order QAM mode control signal on line 196. The control signal is merged onto the control bus 30 for distribution to all of the circuits that are QAM mode dependent.

When the 24-bit sync word is located in the incoming data, all three synchronization tests will have been met. Compare circuit 186 will output an "RS sync" signal to sync state sequencer 188. In response, sync state sequencer 188 will output a sync lock signal on line 198, that is merged onto the control bus 30 for distribution to QAM mode memory 206 and Viterbi decoder 156. This signal causes QAM mode memory 206 to store the current QAM mode control signal from line 196 of the sync state sequencer. In this manner, the proper QAM mode will be available in QAM mode memory 206 and will not have to be reacquired until the receiver is retuned to receive a different signal having a different QAM mode.

Viterbi decoder 156 uses the sync lock signal to reset its renormalization threshold to a large value. This reduces the probability that the Viterbi decoder will falsely declare an out-of-sync condition once the proper QAM mode has been determined.

The initialization signal output from compare circuit 178 when the second synchronization test is passed is merged onto control bus 30 and used to initialize three different components; namely, the trellis decoder formatter 94, the deinterleaver 96, and the Reed-Solomon decoder 98. The initialization signal, which can simply be a single bit such as a digital "one", will initialize the trellis decoder formatter 94 to recreate eight-bit bytes from the three, four, or five-bit nibbles currently being output from the trellis decoder. If the receiver is operating in 16-QAM mode, three-bit nibbles will be processed by the trellis-decoder formatter to provide the necessary eight-bit output byte. For example, the formatter could assemble three bits of a first nibble together with three bits of a second nibble and the first two bits of a third nibble to create the eight-bit byte. For 32-QAM operation, four-bit nibbles will be assembled into the eight-bit bytes. For 64-QAM operation, data from five bit nibbles will be assembled into the eight-bit bytes.

The initialization signal from compare circuit 178 initializes the timing of deinterleaver 96 to properly deinterleave data for use by Reed-Solomon decoder 98. The initialization signal is used by the Reed-Solomon decoder to determine when the first piece of data will arrive from the deinterleaver 96. In this manner, the Reed-Solomon decoder will know when each new word of the incoming data block starts.

It should now be appreciated that the present invention provides a flexible, mode selective QAM communication system. A transmitter can transmit data in any one of a plurality of QAM modes. The receiver will detect the particular QAM mode that is transmitted, and decode the received data accordingly. In the illustrated embodiment, the receiver attempts to decode the received data using different QAM modes until a synchronization condition is detected. The synchronization condition is achieved when three separate synchronization tests have been met. In the first synchronization test, a Viterbi decoder monitors the renormalization rate of its internal path metrics. When the renormalization rate drops below a threshold, sync is declared, indicating that a first deinterleaver that inputs data to the trellis decoder is synchronized.

Having at this point passed the first synchronization test, the second synchronization test is commenced. A sixty-bit sync word is detected at the output of the trellis decoder. The sync word is received from the transmitter unscrambled, but trellis encoded. The detection of the sync word signals the start of a second deinterleaver, and causes initialization of the trellis decoder formatter, the second deinterleaver, and a Reed-Solomon decoder. At this point, the second synchronization test has been passed.

The third synchronization test involves the detection of a 24-bit sync word that is transmitted scrambled. The detection of this sync word at the output of the descrambler signals that the Reed-Solomon decoder is synchronized.

When all of the deinterleavers and decoders are in sync, the Viterbi decoder renormalization threshold is set to a large value to reduce the probability of the Viterbi decoder falsely declaring out-of-sync. If all of the sync states have been tried in one QAM mode, and the conditions for synchronization have not been met, the QAM mode is switched to the next higher order QAM mode, and the synchronization tests are tried again until full synchronization has been achieved.

Although the present invention has been described in connection with a particular embodiment thereof, those skilled in the art will appreciate that numerous adaptations and modifications may be made thereto without departing from the spirit and scope of the invention as set forth in the claims.

What is claimed is:

1. A QAM communication system comprising:
   a transmission subsystem including means for selectively encoding source data for transmission using one of a plurality of QAM modes; and
   a receiver subsystem for receiving QAM data from said transmission subsystem, including means for detecting the QAM mode of the received data by trial and error and means responsive to said detecting means for decoding the received data in accordance with the detected QAM mode; wherein said QAM mode detecting means comprise:
   means for monitoring at least one output of said decoding means to detect a synchronization condition achieved when the received data is processed using a proper QAM mode for the data; and
   means responsive to said monitoring means for actuating said decoding means to attempt to decode said received data using different QAM modes until said synchronization condition is detected;
   wherein the detection of said synchronization condition indicates that the QAM mode then in use by the decoder is the proper QAM mode for the received data.

2. A QAM communication system in accordance with claim 1 wherein said synchronization condition requires a plurality of different synchronization tests to be met.

3. A QAM communication system in accordance with claim 2 wherein said decoding means comprise:
   a trellis decoder; and
   a first synchronization test is met when a renormalization rate of said trellis decoder is below a threshold value.

4. A QAM communication system in accordance with claim 3 wherein said decoding means comprise:
   means for detecting a first synchronization word in said received data; and
   a second synchronization test is met when said first synchronization word is detected.

5. A QAM communication system in accordance with claim 4 wherein said decoding means comprise:
   means for detecting a second synchronization word in said received data; and
   a third synchronization test is met when said second synchronization word is detected.

6. A QAM communication system in accordance with claim 5 wherein said synchronization condition occurs when each of said first, second and third synchronization tests are met.

7. A receiver for receiving data transmitted in one of a plurality of digital modulation modes, comprising:
   means for detecting the digital modulation mode of received data by trial and error; and
   means responsive to said detecting means for decoding the received data in accordance with the detected mode; wherein said mode detecting means comprise:
   means for monitoring at least one output of said decoding means to detect a synchronization condition achieved when the received data is processed using a proper digital modulation mode for the data; and
   means responsive to said monitoring means for actuating said decoding means to attempt to decode said received data using different modes until said synchronization condition is detected;
   wherein the detection of said synchronization condition indicates that the mode then in use by the decoder is the proper mode for the received data.

8. A receiver in accordance with claim 7 wherein said synchronization condition requires a plurality of different synchronization tests to be met.

9. A receiver in accordance with claim 8 wherein said decoding means comprise:
   a trellis decoder; and
   a first synchronization test is met when a renormalization rate of said trellis decoder is below a threshold value.

10. A receiver in accordance with claim 9 wherein said decoding means comprise:
    means for detecting a first synchronization word in said received data; and
    a second synchronization test is met when said first synchronization word is detected.

11. A receiver in accordance with claim 10 wherein said decoding means comprise:
    means for detecting a second synchronization word in said received data; and
    a third synchronization test is met when said second synchronization word is detected.

12. A receiver in accordance with claim 11 wherein said synchronization condition occurs when each of said first, second and third synchronization tests are met.

13. A receiver in accordance with claim 8 wherein said detecting and decoding means comprise:
    an inner decoder followed by an outer decoder for decoding said received data;
    first deinterleaver means for deinterleaving received data prior to input to said inner decoder;
    second deinterleaver means for deinterleaving data from said inner decoder prior to input to said outer decoder;
    means for determining when a renormalization rate of said inner decoder is below a threshold value indicating that a first synchronization test has been met;
    first means for detecting a first synchronization word in data output from said inner decoder indicating that a second synchronization test has been met; and
    second means for detecting a second synchronization word in data output from said outer decoder indicating that a third synchronization test has been met;
    wherein said synchronization condition is achieved when each of said first, second and third synchronization tests have been met.

14. A receiver in accordance with claim 13 wherein said inner decoder is a Viterbi decoder having a selectable renormalization rate threshold, and including means responsive to an attainment of said synchronization condition for increasing said threshold to reduce the probability that said first synchronization test will subsequently fail.

15. A receiver in accordance with claim 14 wherein said outer decoder is a Reed Solomon decoder.

16. A receiver in accordance with claim 13 further comprising:

at least one of a mode dependent adaptive equalizer circuit, mode dependent automatic gain control circuit, and mode dependent carrier recovery circuit coupled to process said received data prior to input to said inner decoder;

wherein said inner decoder and said at least one circuit comprise look up tables for outputting data specific to a detected mode.

17. A receiver in accordance with claim 7 wherein said detecting means include memory means for storing data indicative of the detected mode.

18. A receiver in accordance with claim 7 wherein said digital modulation modes utilize constellation patterns of different sizes, and said actuating means first actuate said decoding means to attempt to decode the received data using a mode having a small constellation size and if necessary, subsequently actuate said decoding means to attempt progressively larger constellation size modes until said synchronization condition is detected.

19. A receiver in accordance with claim 7 wherein said digital modulation modes comprise different QAM modes.

* * * * *